US006227517B1

(12) United States Patent
Wohl

(10) Patent No.: US 6,227,517 B1
(45) Date of Patent: May 8, 2001

(54) MOBILE LAUNCH SUPPORT ADAPTED FOR USE WITH THE RECEIVER TUBE OF A TRAILER HITCH

(76) Inventor: William J. Wohl, PO. 667, Veradale, WA (US) 99037

( * ) Notice: Subject to any disclaimer, the term of this patent is extended or adjusted under 35 U.S.C. 154(b) by 0 days.

(21) Appl. No.: 09/470,184

(22) Filed: Dec. 22, 1999

Related U.S. Application Data

(60) Provisional application No. 60/113,160, filed on Dec. 22, 1998.

(51) Int. Cl.[7] .................................................. F16M 11/00
(52) U.S. Cl. ............................................................ 248/694
(58) Field of Search .......................... 248/694; 280/477, 280/656, 414.1; 124/78, 7, 6; 33/263, 286

(56) References Cited

U.S. PATENT DOCUMENTS 6,076,847 * 6/2000 Thornton ............................. 280/477
6,168,181 * 1/2001 Gadd .................................... 280/477

* cited by examiner

Primary Examiner—Ramon O. Ramirez
(74) Attorney, Agent, or Firm—David S. Thompson

(57) ABSTRACT

Three versions of a mobile launch support are each adapted for use with one or more launching devices which propel clay pigeons into the air for target practice. A preferred version of the invention provides a horizontally oriented insert tube, having a diameter sized for insertion into the receiver tube of a vehicle's trailer hitch. A vertical support tube extends vertically from the end of the insert tube. An attachment tube, extending perpendicularly from the vertical support tube, allows the vertical support tube and the insert tube to be connected during use, and separated for shipment or storage. A support plate assembly, carried by an upper end of the vertical support tube, provides a level surface upon which a launching device may be rigidly attached. An adjustment tube is telescopically slidable within the vertical support tube. The adjustment tube is slid within the support tube until a foot plate, carried by a lower end of the adjustment tube, is positioned on the ground. The foot plate provides rigidity and stability to the mobile launch support, and helps to absorb the recoil during launch.

4 Claims, 3 Drawing Sheets

FIG. 5

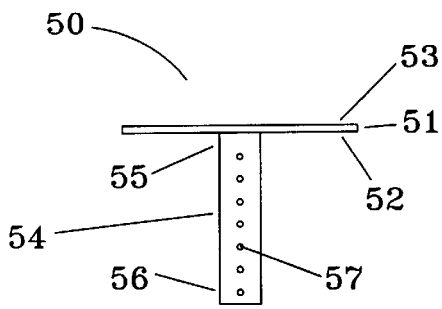
FIG. 3
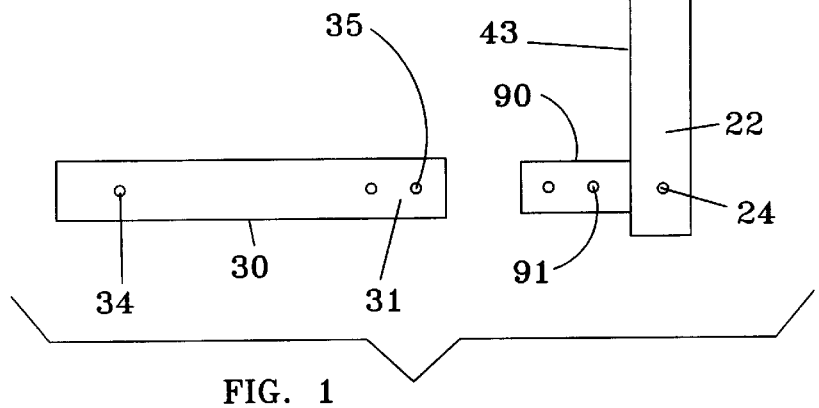
FIG. 1
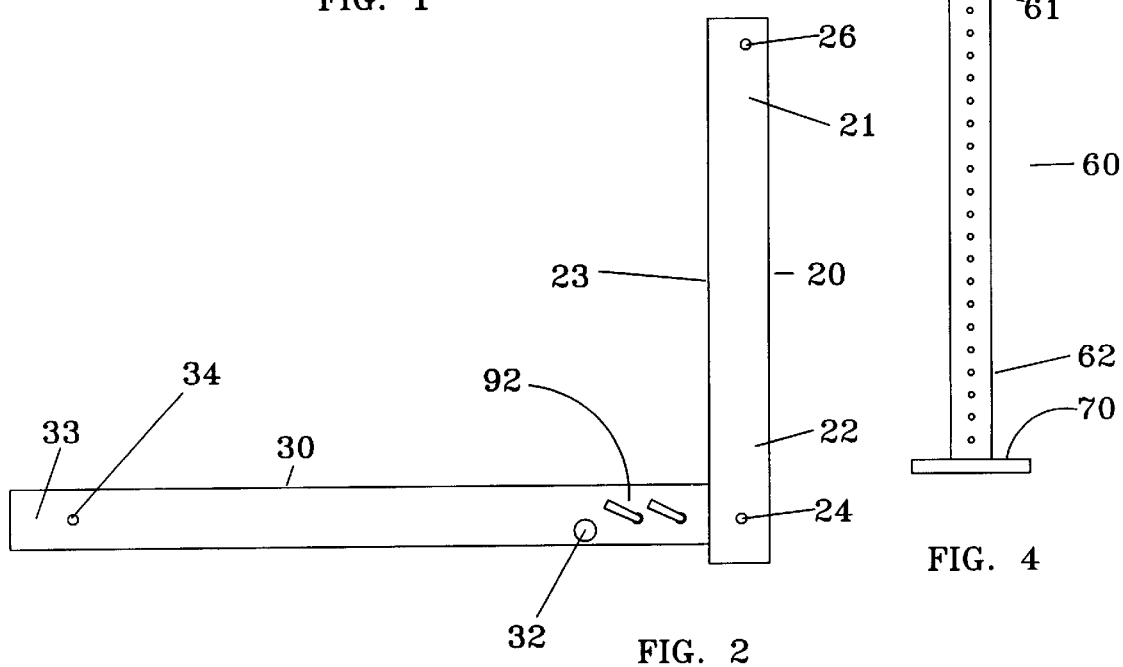
FIG. 2
FIG. 4

MOBILE LAUNCH SUPPORT ADAPTED FOR USE WITH THE RECEIVER TUBE OF A TRAILER HITCH

CROSS-REFERENCES

This application is a continuation of a provisional application having Ser. No. 60/113,160 filed Dec. 22, 1998.

BACKGROUND

A number of mounting brackets, devices and apparatus are known for supporting trap shoot launching machines during use. Known machines fail to adequately address the two major problems associated with trap shoot launching machines, i.e. absorbing the recoil during the launch and providing a proper location and orientation for mounting the machine that does not result in strain the user's back or muscles during the cocking process.

During the launching process, a trap shoot launching machine will experience considerable recoil, as a result of the force resulting from the acceleration and mass of the projectile. The recoil is substantial enough that the launch machine must be attached to a massive or well-anchored object or considerable movement will result.

Also, prior to the launch, the launching device must be cocked, i.e. the spring mechanism must be manually stretched. Since this process is done repeatedly, the user is prone to muscle and joint strain. Most of the strain is due to the angle at which the user must typically address the machine, which does not result in advantageous posture or exercise form.

What is needed is a launch support which is adapted to absorb the recoil of the launch and which is positioned to allow the user to cock the launcher without undue back or muscle strain.

SUMMARY

The present invention is directed to an apparatus that satisfies the above needs. A novel mobile launch support adapted for use with the receiver tube of a vehicle's trailer hitch is disclosed that absorbs the shock and recoil of the launch and also properly positions the launch so that the user may operate it without undue back, joint and muscle strain.

The mobile launch support of the present invention provides some or all of the following structures.

(A) An inside end of an insert tube 30 is releasably attachable to the receiver tube 120 carried by either a utility vehicle 100 or truck 110. The insert tube may be secured by a fastener which typically passes through matched holes defined in the insert tube and receiver tube.

(B) A vertical support tube 20 is fastened to an outside end of the insert tube 30, and allows the support plate assembly to be carried at a desired elevation. A lower end of the vertical support tube carries a perpendicularly oriented attachment tube 90, which is sized to slide into an outside end of the insert tube. Corresponding pairs of fastening holes defined in the outside end of the insert tube and the attachment tube allow two fasteners to be used to lock the insert tube to the vertical support tube.

(C) A support plate assembly 50 is carried by an upper end of the vertical support tube 20, and forms a platform upon which a launching device 200 may attached.

(D) An adjustment tube 60 is sized to slide within the vertical support tube 20 in a telescopic manner and provides a plurality of adjustment holes for adjustable attachment to the vertical support tube. A foot plate 70 is carried by a lower end of the adjustment tube. In operation, the adjustment tube is slid within the vertical support tube until the foot plate is firmly planted on the ground. The adjustable tube is then attached to the vertical support tube.

(E) A footrest 80 is optionally carried by the outside end of the insert tube. The footrest allows an operator to straddle the insert tube, with both feet on the opposed pegs forming the footrest.

It is therefore a primary advantage of the present invention to provide a novel mobile launch support adapted for use with the receiver tube of a vehicle's trailer hitch, and which therefore uses the mass of a vehicle to absorb much of the recoil shock after the launch.

Another advantage of the present invention is to provide a novel mobile launch support adapted for use with the receiver tube of a vehicle's trailer hitch which provides an adjustment tube and associated foot plate which uses the ground to further stabilize the mobile launch after firing.

Another advantage of the present invention is to provide a novel mobile launch support adapted for use with two launching devices.

A still further advantage of the present invention is to provide a novel mobile launch support adapted for use with the receiver tube of a vehicle's trailer hitch which adjusts to compensate for ground which is not level, and for the height of the supporting vehicle.

DRAWINGS

These and other features, aspects, and advantages of the present invention will become better understood with regard to the following description, appended claims, and accompanying drawings where:

FIG. 1 is an exploded side orthographic view of the insert tube and vertical support tube of a version of the invention adapted for use with a utility vehicle.

FIG. 2 is a side orthographic view of the insert tube connected to the vertical support tube of a version of the invention adapted for use with a car or a truck having a fold-down tailgate.

FIG. 3 is a side orthographic view of the support plate assembly seen in the versions of the invention illustrated in FIGS. 1, 2 and 8.

FIG. 4 is a side orthographic view of the adjustment tube seen in the versions of the invention illustrated in FIGS. 1, 2 and 8

DESCRIPTION

Figure 5:
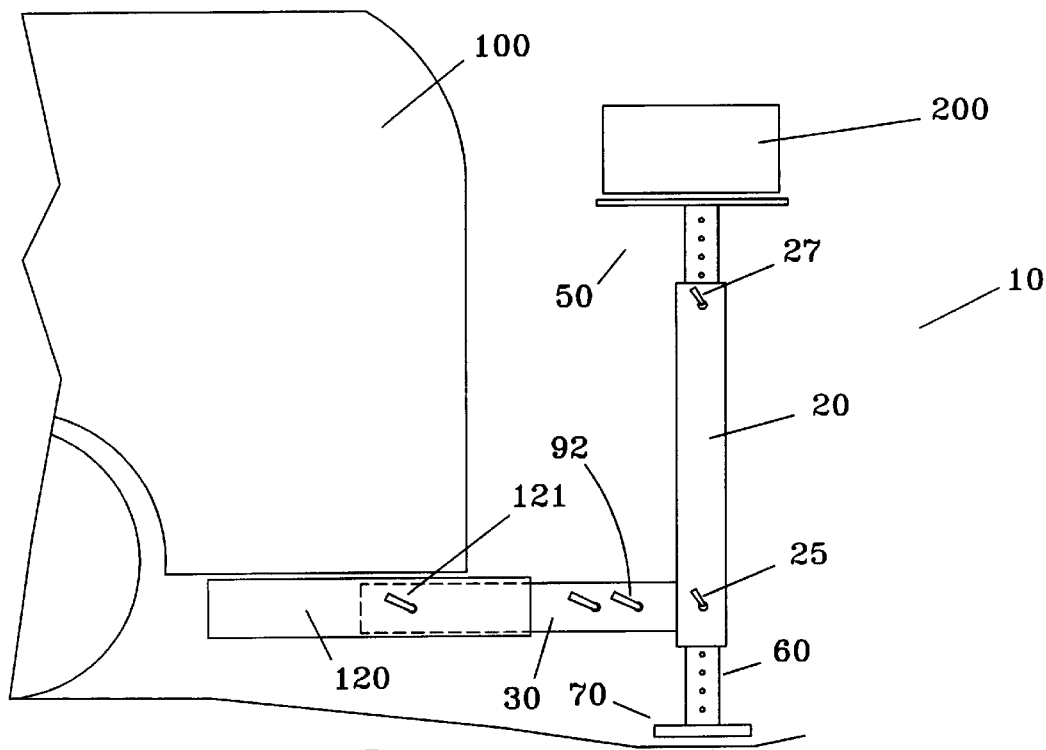
FIG. 5 is a side orthographic view of the version of the invention of FIG. 1 attached to a vehicle without a fold-down tailgate.

Overview.

Referring general to FIGS. 1 through 9, three versions of a mobile launch support 10 constructed in accordance with the principles of the invention is seen. The mobile launch support is adapted for use with a launching device 200 which propels clay pigeons into the air for target practice. As seen in the drawings, a preferred version of the invention provides a horizontally oriented insert tube 30, having a diameter sized for insertion into the receiver tube 120 of a vehicle's trailer hitch. A vertical support tube 20 extends vertically from the end of the insert tube. An attachment tube 90, extending perpendicularly from the vertical support tube, allows the vertical support tube and the insert tube to be connected during use, and separated for shipment or storage. A support plate assembly 50, carried by an upper end of the vertical support tube, provides a level surface upon which a launching device may be rigidly attached. An adjustment tube 60 is telescopically slidable within the vertical support tube. The adjustment tube is slid within the support tube until a foot plate 70, carried by a lower end of the adjustment tube, is positioned on the ground. The foot plate provides rigidity and stability to the mobile launch support, and helps to absorb the recoil during launch.

Insert Tube.

Figure 6:
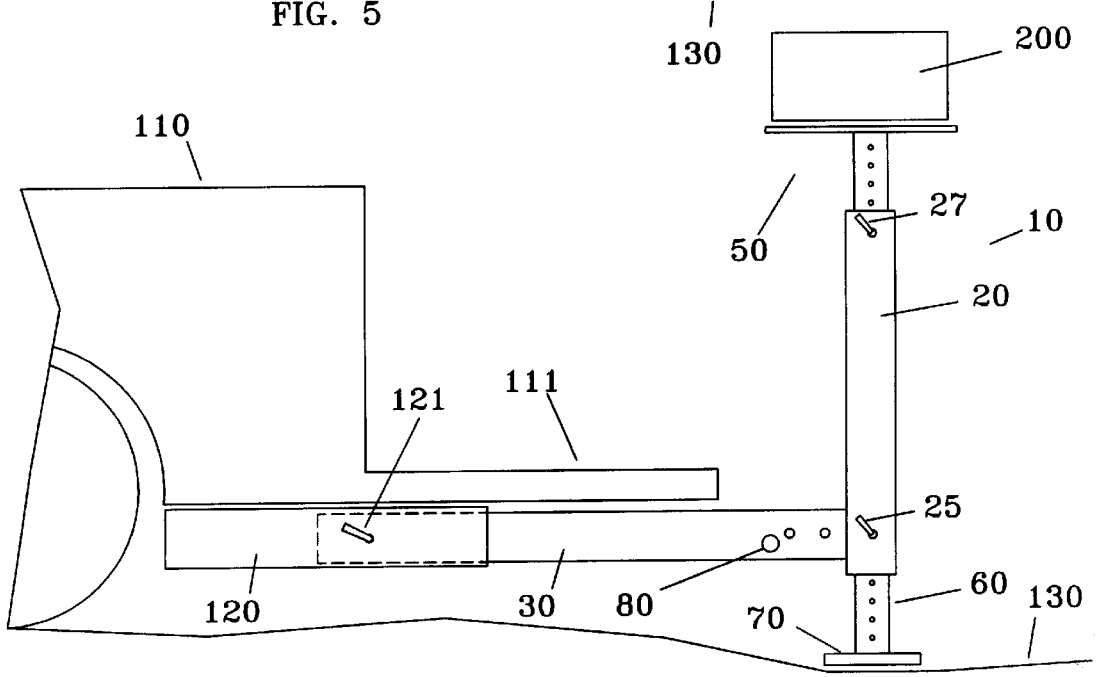
FIG. 6 is a side orthographic view of the version of the invention of FIG. 2 attached to a vehicle having a fold-down tailgate.

Referring to FIGS. 1 and 5, and also to FIGS. 2 and 6, two versions of the insert tube 30 are illustrated. An inside or first end 33 of the insert tube is sized for insertion into standard sized trailer hitch receiver tubes 120. Such receiver tubes exist in several sizes; as a result, differently sized versions of the invention may be adapted for use with each such known receiver tube. A preferred insert tube is made of standard 2 inch square tubing having a ³⁄₁₆ inch wall thickness. A pair of opposed fastening holes 34 are sized for alignment with standardized holes provided in vehicle trailer hitch receiver tubes. A fastener 121 is then used to lock the insert tube to the receiver tube. As seen in FIGS. 5 and 6, the fastener passes through a hole defined in a first side of the receiver tube 120, the holes 34 on opposed sides of the insert tube, and a hole defined on the second side of the receiver tube.

The length of the insert tube may be varied, particularly depending upon the vehicle to which the insert tube will be attached. As seen in FIGS. 1 and 5, a version of the invention is adapted for use with a vehicle, such as an utility vehicle 100 having no tailgate, but instead having a door which opens upwardly or one or more hinged doors which open to the side about generally vertical hinges. In this version of the invention, the insert tube is typically 15.75 inches long.

An alternate version of the invention, as seen in FIGS. 2 and 6, is adapted for use with a vehicle such as a station wagon-type car or a truck 110 with a tailgate 111. In this version, the length of the insert tube is typically 29.75 inches. The extra length allows the tailgate to be lowered, as seen in FIG. 6, thereby providing a place for the user to sit during operation.

Vertical Support Tube.

As seen in FIGS. 1 through 4, a lower end 22 of the vertical support tube 20 is attached to the outside end 31 of the insert tube 30. A preferred vertical support tube is approximately 24 inches long, and is made of 2 inch square tubing with a ³⁄₃₂ inch wall thickness.

A pair of lower fastening holes 24 are defined in opposed sides of the lower end 22 of the vertical support tube, and are typically sized at ⁷⁄₁₆" or similar for alignment with the adjustment holes 61 of the adjustment tube 60. A lower fastener 25 may be a bolt or pin, which may be inserted through the pair of lower fastening holes 24 in the vertical support tube and through holes 61 defined in the adjustment tube when the holes 24, 61 are aligned, thereby fixing the vertical support tube and adjustment tube.

A pair of upper fastening holes 26 are defined on opposed sides of the upper end 21 of the vertical support tube. An associated upper fastener 27, passing through the holes 26 and through holes 57 defined in the support plate assembly, provide for adjustable attachment of the support plate assembly 50.

Attachment Tube.

Referring to FIG. 1, an outside end 31 of the insert tube 30 is attached to a side surface 23 adjacent to the lower end 22 of the vertical support tube 20 by means of an attachment tube 90. The attachment tube extends perpendicularly from the lower end 22 of the support tube, and is typically welded in place. The attachment tube has an outside cross-section which is incrementally smaller than the inside cross-section of the outside end 31 of the insert tube. The attachment tube can therefore be inserted into the insert tube and locked into place.

Two pair of fastening holes 91, one hole of each pair on each side of the attachment tube, are sized and located to correspond to similar holes 35 defined in the outside end 31 of the insert tube. With the holes lined up, bolt or pin fasteners 92 may be inserted through the holes to lock the attachment tube, and therefore the vertical support tube, to the insert tube.

Support Plate Assembly.

A support plate assembly 50 is carried by an upper end 21 of the vertical support tube. The support plate assembly includes a support plate 51 and a support tube 54. The support plate assembly provides a surface having an adjustable elevation on which to mount a known, commercially available, launching device 200. Because the support plate assembly is adjustable in height, the user is able to select a comfortable height for operation of the launching device.

A lower surface 52 of the support plate 51 is attached, typically by a welded connection, to an upper end 55 of the support tube 54. The lower end 56 of the support tube 54 has an outside dimension incrementally smaller than the inside diameter of the vertical support tube 20, and is therefore sized for adjustable sliding movement within the support tube.

A plurality of adjustment hole pairs 57 defined in a vertical array along the support tube 54 allow adjustable fastening to the upper fastening hole 26 of the vertical support tube 20. A fastener 27 may be used to make a rigid connection between the two.

The upper surface 53 of the support plate is adapted by size and shape, as well as the availability of the appropriate fasteners and/or fastening holes, to support the launching device 200. A preferred support plate is approximately 4 inches by 7 inches, and is ⅛ inch thick steel plate.

Adjustment Tube.

As seen in FIGS. 1 and 2, an adjustment tube 60 is sized for telescopic movement within the vertical support tube 20. A preferred adjustment tube is 1.75 inch square tubing having a length of approximately 24 inches. A plurality of adjustment holes 61, arranged in pairs on opposed sides of the tubing, are spaced at approximately 1 inch intervals. The holes are typically ⁷⁄₁₆ inch in diameter, and are sized for connection to a similar ⁷⁄₁₆ inch diameter hole 24 defined in the lower end 22 of the vertical support tube 20.

Foot Plate.

A foot plate 70 is carried by a lower end 62 of the adjustment tube. By placing the foot plate on the ground 130, the foot plate supports the adjustment tube in a rigid manner. The foot plate may be any size; however a preferred size that is stable even on soft ground, such as grass, is approximately 4 inches by 4 inches, and made of ⅛ inch steel plate.

Footrest.

Figure 7:
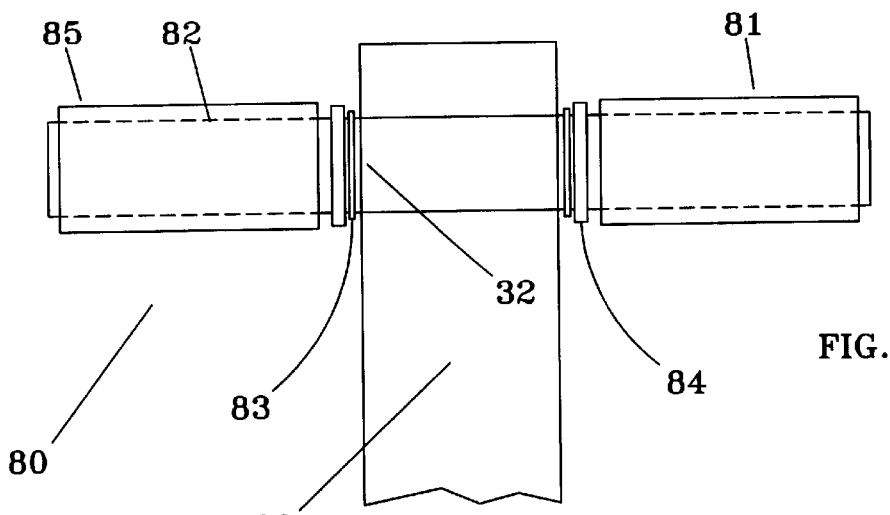
FIG. 7 is an enlarged orthographic view of the footrest adapted for use with any version of the invention.

As seen particularly in FIG. 7, a footrest 80 may optionally be provided, particularly on the version of the invention adapted for use with vehicles having a tailgate, i.e. the version of FIGS. 2 and 6. As seen in FIG. 7, a preferred footrest 80 includes opposed foot pegs 81 on either side of the outside end 31 of the insert tube 30. The footrest allows the user to sit on the tailgate, with legs on either side of the insert tube 30, and feet supported on the footrest 80.

A preferred footrest 80 is made from a threaded pipe 82, which is inserted through the footrest support hole 32 defined in the outside end 31 of the insert tube. The threaded pipe is secured on either side of the insert tube by a lock washer 83 and nut 84. A rubber cover 85 is typically provided for padding.

Double Mobile Launch Support.

Figure 8:
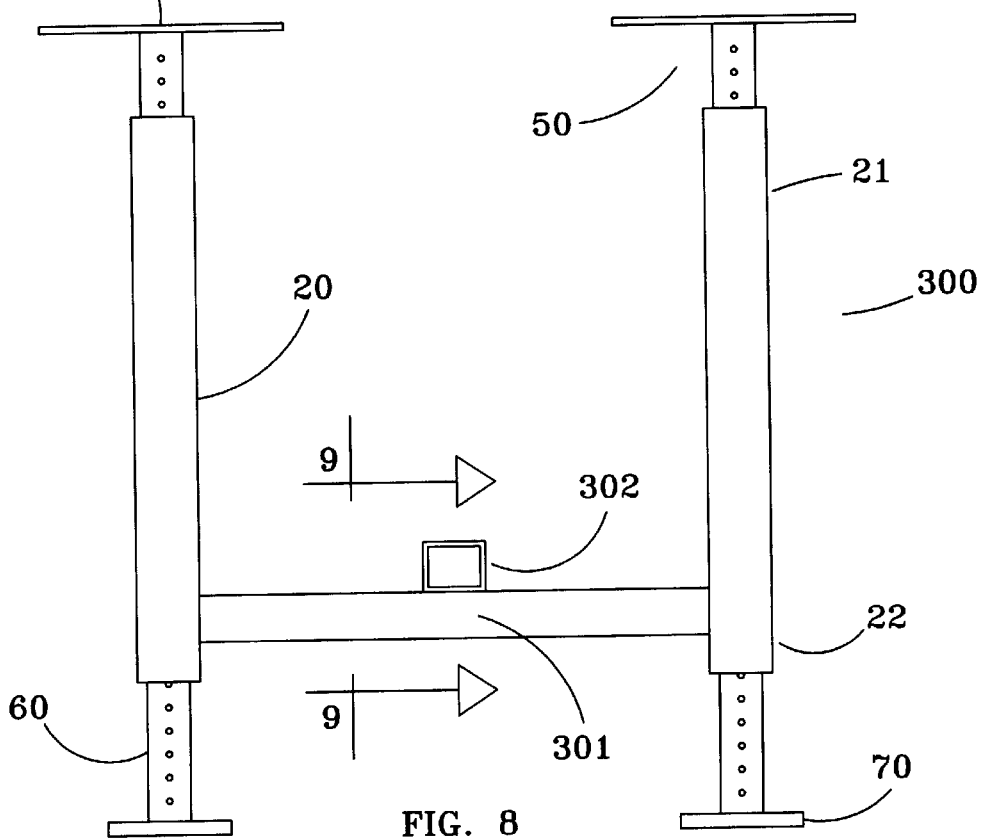
FIG. 8 is an end orthographic view of a double mobile launch support version of the invention.

As seen in FIG. 8, a version 300 of the mobile launch is adapted to support two launching devices. The outside end of the insert tube 30 is attached to a socket tube 302 carried by a middle portion of a horizontal connector tube. First and second ends of the horizontal connector tube 301 are welded to first and second vertical support tubes 20. The upper end 21 of each vertical support tube carries a support plate assembly 50. The lower end of each vertical support tube carries an adjustment tube 60 and foot plate 70.

As seen in FIG. 8, a preferred version of the horizontal connector tube 301 is made of 2" square tubing 17.5 inches long.

Figure 9:
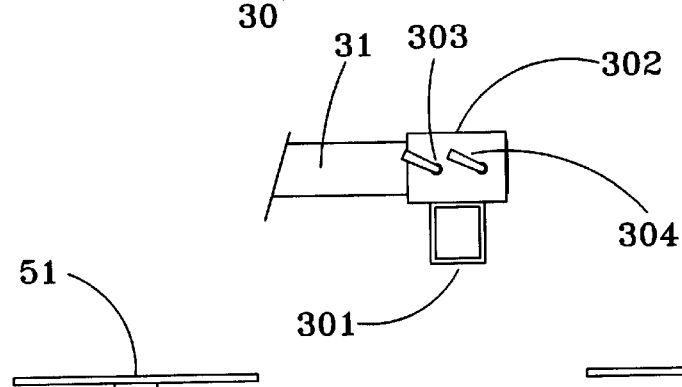
FIG. 9 is a side orthographic view of the socket tube and horizontal connector tube of the version of the invention seen in FIG. 8, taken along the 9—9 lines.

As seen in FIGS. 8 and 9, a socket tube 302 is welded or otherwise attached to the horizontal connector tube 301. The inside dimensions of the socket tube are incrementally greater than the outside dimensions of the outside end 31 of the insert tube 30, allowing the insert tube to be inserted into the socket tube, as seen in FIG. 9.

Continuing to refer to FIG. 9, two pair of fastener holes 303 are defined in the socket tube, with one hole of each pair on each side. The holes are sized and oriented to allow insertion of a pin 304 or similar fastener through each pair and through corresponding pairs of holes 35 defined in the outside end 31 of the insert tube.

Operation.

To use the mobile launch support 10, the adjustment tube 60 is inserted into the vertical support tube 20, but is typically not secured into place.

The inside end 33 of the insert tube 30 is inserted into the receiver tube 120 of a vehicle's trailer hitch. The fastening hole 34 is aligned with the fastener 121 of the receiver tube, and secured in place with fastener 121.

The adjustment tube is then lowered as much as possible within the vertical support tube, causing the foot plate 70 to be supported on the ground 130. The adjustment tube is then secured to the vertical support tube 20 by aligning one of the pairs of adjustment holes 61 with the fastening hole 24 defined in the lower end 22 of the vertical support tube. A pin, bolt 25 or other fastener is then used to secure the adjustment tube to the vertical support tube.

The support plate assembly is then raised or lowered to an appropriate height, wherein a pair of support tube adjustment holes 57 are aligned with the upper fastening hole pair 26. The upper fastener 27 is then used to lock the support plate assembly in place.

A launching device 200 is then attached to the upper surface 53 of the support plate 51 by the appropriate fastening means.

Where the vehicle has a tailgate, and the version of the invention of FIGS. 2 and 6 is used, the user may sit on the tailgate and straddle the insert tube with one foot on either foot peg 81.

The invention resides not in any one of these features per se, but rather in the particular combination of all of them herein disclosed and claimed and it is distinguished from the prior art in this particular combination of all of its structures for the functions specified.

Advantages.

The previously described versions of the present invention have many advantages, including primary advantage of providing a novel mobile launch support adapted for use with the receiver tube of a vehicle's trailer hitch, and which therefore uses the mass of a vehicle to absorb much of the recoil shock after the launch.

Another advantage of the present invention is to provide a novel mobile launch support adapted for use with a receiver tube of a vehicle's trailer hitch which provides an adjustment tube and associated foot plate which uses the ground to further stabilize the mobile launch after firing.

Another advantage of the present invention is to provide a novel mobile launch support adapted for use with two launching devices.

A still further advantage of the present invention is to provide a novel mobile launch support adapted for use with a receiver tube of a vehicle's trailer hitch which adjusts to compensate for ground which is not level, and for the height of the supporting vehicle.

Although the present invention has been described in considerable detail and with reference to certain preferred versions, other versions are possible. For example, while square tubing is used in the preferred version of the invention, circular pipe or other tubing could be substituted. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A mobile launch support, comprising:
   (A) an insert tube having an inside end defining a pair of fastening holes and an outside end defining at least one pair of fastening holes;
   (B) a vertical support tube, comprising:
      (a) a lower end of the vertical support tube supporting an attachment tube oriented perpendicularly, to the vertical support tube, the attachment tube having a cross-section sized to slide into an outside end of the insert tube;
      (b) at least one pair of fastening holes defined in the attachment tube, the attachment tube fastened to the at least one pair of fastening holes defined in the outside end of the insert tube;
      (c) one pair of fastening holes defined in an upper end of the vertical support tube; and
      (d) one pair of fastening holes defined in a lower end of the vertical support tube;

(C) a support plate assembly carried by an upper end of the vertical support tube, comprising:
  (a) a support tube, sized for travel within the upper end of the vertical support tube, the support tube defining one pair of adjustment holes for adjustable attachment to the one pair of fastening holes defined in an upper end of the vertical support tube; and
  (b) a support plate, carried by an upper end of the support tube; and
(D) an adjustment tube, sized to slide within the vertical support tube in a telescopic manner, defines a plurality of adjustment holes for adjustable attachment to the vertical support tube, a lower end of the adjustment tube carrying a foot plate.

2. The mobile launch support of claim 1, additionally comprising:
(A) a footrest, carried by the outside end of the insert tube, comprising opposed pegs.

3. A mobile launch support, comprising:
(A) an insert tube having an inside end defining a pair of fastening holes and an outside end defining at least one pair of fastening holes;
(B) a horizontal connector tube;
(C) a socket tube, carried by the horizontal connector tube, the socket tube defining at least one pair of fastening holes corresponding to the at least one pair of fastening holes defined in the outside end of the insert tube, the socket tube receiving the outside end of the insert tube;
(D) first and second vertical support tubes, attached to first and second ends of the horizontal connector tube, respectively, each vertical support tube comprising:
  (a) a lower end of the vertical support tube supporting an attachment tube oriented perpendicularly to the vertical support tube, the attachment tube having a cross-section sized to slide into an outside end of the insert tube;
  (b) at least one pair of fastening holes defined in the attachment tube, the attachment tube fastened to the at least one pair of fastening holes defined in the outside end of the insert tube;
  (c) one pair of fastening holes defined in an upper end of the vertical support tube; and
  (d) one pair of fastening holes defined in a lower end of the vertical support tube;
(E) first and second support plate assemblies, carried by an upper end of the first and second vertical support tubes, respectively, each support plate assembly comprising:
  (a) a support tube, sized for travel within the upper end of the vertical support tube, the support tube defining one pair of adjustment holes for adjustable attachment to the one pair of fastening holes defined in an upper end of the vertical support tube; and
  (b) a support plate, carried by an upper end of the support tube; and
(F) first and second adjustment tubes, sized to slide within the first and second vertical support tubes in a telescopic manner, each of the first and second vertical support tubes defining a plurality of adjustment holes for adjustable attachment to the first and second vertical support tubes, a lower end of each of the first and second adjustment tubes carrying a foot plate.

4. The mobile launch support of claim 3, additionally comprising:
(A) a footrest, carried by the outside end of the insert tube, comprising opposed pegs.

* * * * *